United States Patent
Arai et al.

(10) Patent No.: US 10,090,532 B2
(45) Date of Patent: Oct. 2, 2018

(54) METHOD FOR PRODUCING FUEL CELL ELECTRODE

(71) Applicant: TOYOTA JIDOSHA KABUSHIKI KAISHA, Toyota-shi, Aichi-ken (JP)

(72) Inventors: Tatsuya Arai, Susono (JP); Takazumi Mandokoro, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 103 days.

(21) Appl. No.: 15/095,279

(22) Filed: Apr. 11, 2016

(65) Prior Publication Data

US 2016/0301083 A1   Oct. 13, 2016

(30) Foreign Application Priority Data

Apr. 13, 2015 (JP) ................ 2015-081962

(51) Int. Cl.
| | | |
|---|---|---|
| *H01M 4/88* | (2006.01) | |
| *H01M 4/92* | (2006.01) | |
| *H01M 4/90* | (2006.01) | |
| *H01M 4/86* | (2006.01) | |
| *H01M 4/96* | (2006.01) | |
| H01M 8/1018 | (2016.01) | |

(52) U.S. Cl.
CPC ....... *H01M 4/8828* (2013.01); *H01M 4/8652* (2013.01); *H01M 4/8673* (2013.01); *H01M 4/8882* (2013.01); *H01M 4/9016* (2013.01); *H01M 4/923* (2013.01); *H01M 4/926* (2013.01); *H01M 4/96* (2013.01); *H01M 4/8857* (2013.01); *H01M 2008/1095* (2013.01)

(58) Field of Classification Search
None
See application file for complete search history.

(56) References Cited

U.S. PATENT DOCUMENTS

| 7,318,977 B2 | 1/2008 | He et al. |
| 7,740,975 B2 | 6/2010 | He et al. |
| 2002/0107140 A1* | 8/2002 | Hampden-Smith ...... B01J 2/003 502/185 |
| 2004/0072683 A1* | 4/2004 | Kodas ............... B22F 1/025 502/224 |
| 2010/0129730 A1* | 5/2010 | Suzuki ............... H01M 4/881 429/483 |
| 2010/0196785 A1* | 8/2010 | Sakai ............... H01M 4/8605 429/483 |
| 2012/0178018 A1* | 7/2012 | Querner ............ H01M 4/8647 429/524 |
| 2013/0244133 A1* | 9/2013 | Wieland ............ H01M 4/8605 429/482 |
| 2013/0302715 A1* | 11/2013 | Horikita ............ H01M 4/925 429/485 |
| 2014/0099571 A1* | 4/2014 | Proietti ............. H01M 4/8828 429/527 |

FOREIGN PATENT DOCUMENTS

| JP | 2006-134613 A | 5/2006 |
| JP | 2011-258452 A | 12/2011 |
| JP | 2012-035218 A | 2/2012 |

OTHER PUBLICATIONS

Dae-Suk Kim et al. "Additive treatment effect of TiO2 as supports for Pt-based electrocatalysts on oxygen reduction reaction activity", Electrochimica Acta, 55 (2010), pp. 3628-3633.

* cited by examiner

*Primary Examiner* — Rena Dye Cronin
(74) *Attorney, Agent, or Firm* — Hunton Andrews Kurth LLP

(57) ABSTRACT

The present invention provides a method for producing a fuel cell electrode which is configured to be able to deliver stable electricity generation performance even if the humidity condition of the external environment is changed. Disclosed is a method for producing a fuel cell electrode comprising a catalyst layer that contains a catalyst composite-carried carbon containing platinum, a titanium oxide and an electroconductive carbon, wherein the method comprises: a first step of decreasing an amount of acidic functional groups on a surface of the catalyst composite-carried carbon by firing the catalyst composite-carried carbon at 250° C. or more; a second step of producing a catalyst ink by mixing the catalyst composite-carried carbon obtained in the first step, an ionomer, and a solvent; and a third step of forming the catalyst layer using the catalyst ink obtained in the second step.

3 Claims, 1 Drawing Sheet

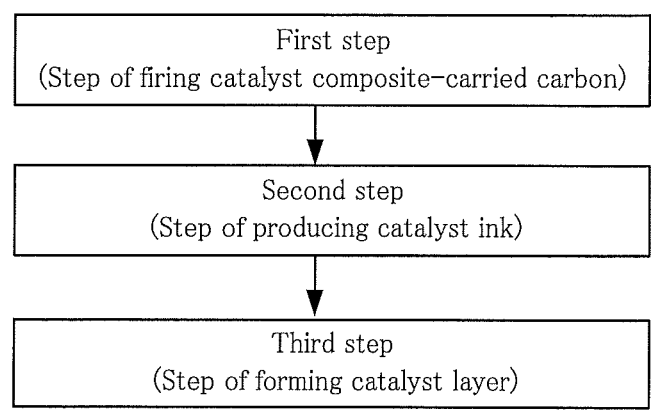

METHOD FOR PRODUCING FUEL CELL
ELECTRODE

CROSS-REFERENCE TO RELATED APPLICATION

The present application claims priority to Japanese Patent Application No. 2015-081962 filed on Apr. 13, 2015, which is incorporated herein by reference in its entirety.

BACKGROUND OF THE INVENTION

Technical Field

The present invention relates to a method for producing a fuel cell electrode.

Background Art

A fuel cell is a cell in which a fuel and an oxidant are supplied to two electrically-connected electrodes to electrochemically oxidize the fuel, thereby converting chemical energy directly to electrical energy. Accordingly, it is not limited by the Carnot cycle and shows high energy conversion efficiency. A fuel cell generally includes a stack of fuel cells, each having a membrane electrode assembly (MEA) as the basic structure, which is composed of a pair of electrodes and an electrolyte membrane sandwiched therebetween.

Platinum and platinum alloy materials have been used as the electrode catalyst of a fuel electrode (anode electrode) and an oxidant electrode (cathode electrode) in a fuel cell. However, since platinum is expensive, there have been attempts to reduce the amount of platinum used as the catalyst, by use of platinum in combination with an inexpensive material.

Of such attempts, a fuel cell catalyst in which platinum-metal oxide composite particles are carried on an electroconductive carrier, has attracted attention as a fuel cell electrode catalyst. For example, an electrode catalyst for polymer electrolyte fuel cells is disclosed in Patent Literature 1, which is composed of composite particles made of platinum or a platinum-containing noble metal alloy and a metal oxide other than noble metals, and which is used for the air electrode of a polymer electrolyte fuel cell that includes a membrane electrode assembly composed of a solid polymer electrolyte membrane, which is permeable to protons, and fuel and air electrodes, each of which includes a catalyst layer containing an electrode catalyst.

Patent Literature 1: Japanese Patent Application Laid-Open No. 2006-134613

SUMMARY OF THE INVENTION

However, a conventional fuel cell catalyst in which platinum-metal oxide composite particles are carried on an electroconductive carrier, has the following problem: electricity generation performance obtained when the fuel cell catalyst is incorporated in a membrane-electrode assembly, is not comparable to an expected degree of catalytic activity per unit mass of platinum (hereinafter may be referred to as platinum mass activity) obtained when electrochemical measurement with a rotating disk electrode (RDE) is subjected to the fuel cell catalyst is in a powdery form. This problem is particularly prominent in the case where there is a large change in external environmental conditions such as temperature and humidity.

In prior-art techniques, during the step of carrying the platinum-metal oxide composite particles on the electroconductive carrier, the surface characteristics of the electroconductive carrier may be changed, and in the resulting catalyst ink, the affinity between the electroconductive carrier surface and the ionomer or solvent may be deteriorated. If the affinity between the components in the catalyst ink is deteriorated, the platinum-metal oxide composite particles and the electroconductive carrier cannot be sufficiently coated with the ionomer, at the time of forming the catalyst layer. It is known that a membrane electrode assembly using such an insufficiently-coated electrode is not adaptable to changes in the external environment conditions and fails in delivery of stable electricity generation performance.

Meanwhile, in the electrochemical measurement with RDE, liquid electrolyte serves for proton conduction and oxygen diffusion, so that there is no change in the external environment, and the influence of ionomer coverage is not reflected in the measurement results.

The present invention was achieved in light of the above circumstances. An object of the present invention is to provide a method for producing a fuel cell electrode including a catalyst layer that contains a catalyst composite-carried carbon containing platinum, a titanium oxide and an electroconductive carbon, which is configured to be able to deliver stable electricity generation performance even if there is a change in the external environmental conditions.

The fuel cell electrode production method of the present invention is a method for producing a fuel cell electrode including a catalyst layer that contains a catalyst composite-carried carbon containing platinum, a titanium oxide and an electroconductive carbon, wherein the method includes: a first step of decreasing an amount of acidic functional groups on a surface of the catalyst composite-carried carbon by firing the catalyst composite-carried carbon at 250° C. or more under an inert gas atmosphere; a second step of producing a catalyst ink by mixing the catalyst composite-carried carbon obtained in the first step, an ionomer, and a solvent which contains at least water, alcohol and acetic acid and in which the acetic acid accounts for 29 to 63% by mass of a total amount of the water, alcohol and acetic acid; and a third step of forming the catalyst layer using the catalyst ink obtained in the second step.

In the fuel cell electrode production method of the present invention, the amount of the acidic functional groups on the surface of the catalyst composite-carried carbon obtained in the first step is preferably 1.20 μmol/m$^2$ or less.

In the fuel cell electrode production method of the present invention, the water preferably accounts for 3.4 to 9.8% by mass of the total amount of the water, alcohol and acetic acid in the solvent used in the second step.

In the fuel cell electrode production method of the present invention, the catalyst composite-carried carbon used in the first step is preferably a catalyst composite-carried carbon subjected to an acid treatment.

According to the present invention, a method for producing a fuel cell electrode including a catalyst layer that contains a catalyst composite-carried carbon containing platinum, a titanium oxide and an electroconductive carbon can be provided, which is configured to be able to deliver stable electricity generation performance even if the humidity condition of the external environment is changed.

BRIEF DESCRIPTION OF THE DRAWING

FIG. 1 is a flow chart showing the production steps of the fuel cell electrode production method of the present invention.

DETAILED DESCRIPTION OF THE INVENTION

The fuel cell electrode production method of the present invention is a method for producing a fuel cell electrode including a catalyst layer that contains a catalyst composite-carried carbon containing platinum, a titanium oxide and an electroconductive carbon, wherein the method includes: a first step of decreasing an amount of acidic functional groups on a surface of the catalyst composite-carried carbon by firing the catalyst composite-carried carbon at 250° C. or more under an inert gas atmosphere; a second step of producing a catalyst ink by mixing the catalyst composite-carried carbon obtained in the first step, an ionomer, and a solvent which contains at least water, alcohol and acetic acid and in which the acetic acid accounts for 29 to 63% by mass of a total amount of the water, alcohol and acetic acid; and a third step of forming the catalyst layer using the catalyst ink obtained in the second step.

The present invention makes it possible to produce a fuel cell electrode including a catalyst layer that contains a catalyst composite-carried carbon containing platinum, a titanium oxide and an electroconductive carbon, which is able to deliver stable electricity generation performance irrespective of a humidity condition. The production method of the present invention enables the following: (1) the adsorption of the ionomer on the catalyst composite-carried carbon can be promoted by decreasing the amount of the acidic functional groups on the surface of the catalyst composite-carried carbon by firing the catalyst composite-carried carbon under an inert gas atmosphere; (2) the affinity between the solvent of the catalyst ink and the catalyst-carried carbon on which the amount of the acidic functional groups has been decreased, can be increased by adding a certain amount or more of acetic acid to a generally-used solvent of a catalyst ink, which is made of water and alcohol; and (3) the dispersibility of the ionomer in the catalyst ink can be increased by setting the amount of the acetic acid added to the solvent of the catalyst ink to a certain amount or less. By these steps, the affinity between the catalyst composite-carried carbon surface, the ionomer and the solvent of the catalyst ink is improved; therefore, it is inferred that a fuel cell electrode which is able to deliver stable electricity generation performance irrespective of a humidity condition, can be produced.

FIG. 1 is a flow chart showing the production steps of the fuel cell electrode production method of the present invention.

As shown in FIG. 1, the fuel cell electrode production method of the present invention includes the first step (the step of firing the catalyst composite-carried carbon), the second step (the step of producing the catalyst ink) and the third step (the step of forming the catalyst layer).

Hereinafter, these steps will be described in order.

(1) The First Step (the Step of Firing the Catalyst Composite-Carried Carbon)

The first step is a step of decreasing the amount of the acidic functional groups on the surface of the catalyst composite-carried carbon by firing the catalyst composite-carried carbon containing platinum, a titanium oxide and an electroconductive carbon at 250° C. or more under an inert gas atmosphere.

As described above, in prior-art techniques, the amount of the acidic functional groups on the carbon carrier surface may be increased at the time of carrying the catalyst composite on the electroconductive carbon. Especially when the catalyst composite-carried carbon is subjected to an acid treatment, the amount of the acidic functional groups is remarkably increased.

In the first step, by firing the catalyst composite-carried carbon containing platinum, a titanium oxide and an electroconductive carbon under an inert gas atmosphere, the amount of the acidic functional groups on the surface of the catalyst composite-carried carbon can be decreased. It is considered that if the amount of the acidic functional groups is decreased by the firing, the carbon carrier surface becomes more hydrophobic, and the hydrophobic interaction of the surface with the ionomer, which is hydrophobic, is increased; therefore, the ionomer can be easily adsorbed on the catalyst composite-carried carbon.

In the present invention, the catalyst composite is not particularly limited, as long as it contains platinum and a titanium oxide. The catalyst composite is preferably a composite oxide of platinum and a titanium oxide, and it is preferably one obtained by alloying platinum and titanium and then oxidizing the titanium.

It is preferable to coat the surface of the titanium oxide with platinum, since the amount of the platinum used can be reduced, with retaining high catalytic activity.

The electroconductive carbon contained in the catalyst composite-carried carbon is not particularly limited, as long as it can carry the catalyst composite. The examples include carbon particles such as CA250 (product name; manufactured by: Denka Co., Ltd.), OSAB (product name; manufactured by: Denka Co., Ltd.), Vulcan (product name; manufactured by: Cabot), Ketjen Black (product name; manufactured by: Ketjen Black International Company), Norit (product name; manufactured by: Norit), Black Pearls (product name; manufactured by: Cabot) and Acetylene Black (product name; manufactured by: Chevron). The examples also include carbon nanotubes, carbon nanohorns, carbon nanowalls and carbon nanofibers.

In the present invention, the catalyst composite-carried carbon used in the first step is not particularly limited, as long as the catalyst composite is carried on the electroconductive carbon. The method for carrying the catalyst composite on the electroconductive carbon can be a method for directly carrying the particles of the catalyst composite on the electroconductive carbon, or a method in which a platinum-containing solution, a titanium-containing solution and the electroconductive carbon are mixed in a solvent to carry the platinum and the titanium on the electroconductive carbon in the form of a platinum ion compound and a titanium ion compound, and then the resultant is fired to turn the platinum ion compound and the titanium ion compound into platinum-titanium oxide composite particles, thereby carrying the catalyst composite on the electroconductive carbon.

In the present invention, the catalyst composite-carried carbon is fired at 250° C. or more under an inert gas atmosphere.

The inert gas is not particularly limited, as long as it is inert to the catalyst composite-carried carbon. The inert gas is preferably rare gas, more preferably argon gas.

By setting the firing temperature to 250° C. or more, the amount of the acidic functional groups on the surface of the catalyst composite-carried carbon can be decreased. To efficiently decrease the acidic functional groups without any influence on other characteristics of the catalyst composite-carried carbon, the firing temperature is generally 300° C. or less.

The firing time is not particularly limited. To efficiently decrease the acidic functional groups, the firing time is preferably one hour or more. Also, the firing time is generally three hours or less.

The firing is carried out by putting the catalyst composite-carried carbon into a heat-resistant container and placing the container in a temperature-controlled furnace. The furnace used is not particularly limited, as long as it can heat the container under an inert gas atmosphere. For example, a tubular furnace is generally used.

In the present invention, the acidic functional groups are functional groups that can adsorb ammonia gas by chemical adsorption. The catalyst composite-carried carbon is put into a measurement cell having a constant volume, and ammonia gas is introduced therein. A change in pressure before and after the introduction is converted by the following formula (1), thereby calculating the amount of the adsorbed ammonia gas (mol/g) per mass of the catalyst composite-carried carbon. Since the platinum on the catalyst composite surface does not adsorb ammonia gas, it can be considered that the ammonia gas is adsorbed on the carbon carrier surface.

$$\frac{p}{v(p_0 - p)} = \frac{1}{v_m c} + \left(\frac{c-1}{v_m c}\right)\frac{p}{p_0} \quad \text{Formula (1)}$$

In the formula (1), $P_0$: Saturated vapor pressure of adsorbent at measurement temperature. P: Pressure in adsorption equilibrium. v: Adsorbed amount in adsorption equilibrium. $v_m$: Monomolecular adsorption amount. c: Constant.

The amount of the acidic functional groups on the surface of the catalyst composite-carried carbon is expressed by a value (mol/m$^2$) obtained by dividing the amount (mol/g) of the adsorbed ammonia gas per mass of the catalyst composite-carried carbon by the BET surface area (m$^2$/g) per mass of the carbon carrier contained in the catalyst composite-carried carbon.

The BET surface area (m$^2$/g) per mass of the carbon carrier contained in the catalyst composite-carried carbon is calculated as follows. First, the catalyst composite-carried carbon is put into a measurement cell having a constant volume, and N$_2$ is introduced therein. A change in pressure before and after the introduction is converted by the above formula (1), thereby calculating the amount of the adsorbed nitrogen gas (cm$^3$/g) per mass of the catalyst composite-carried carbon. The amount of the adsorbed nitrogen gas (cm$^3$/g) per mass of the catalyst composite-carried carbon calculated by the formula (1) is converted by the following formula (2), thereby calculating the BET surface area (m$^2$/g) per mass of the catalyst composite-carried carbon.

$$S = A \times v_m \times \frac{N}{W} \quad \text{Formula (2)}$$

In the formula (2), S: Specific surface area. A: Cross-sectional area of adsorbed molecule. $v_m$: Monomolecular adsorption amount. N: Avogadro's number. W: Amount of sample.

Next, the mass ratio of the carbon contained in the catalyst composite-carried carbon is calculated by an NCH method (elemental analysis). The BET surface area (m$^2$/g) per mass of the carbon carrier contained in the catalyst composite-carried carbon is calculated by the following formula (3), considering that the platinum on the catalyst composite surface does not adsorb nitrogen gas.

Formula (3)
BET surface area (m$^2$/g) per mass of the carbon carrier contained in the catalyst composite-carried carbon=BET surface area (m$^2$/g) per mass of the catalyst composite-carried carbon/Mass ratio (mass/mass) of the carbon contained in the catalyst-carried carbon In the present invention, the amount of the acidic functional groups on the surface of the fired catalyst composite-carried carbon is preferably 1.20 µmol/m$^2$ or less, more preferably 1.05 µmol/m$^2$ or less.

The catalyst composite-carried carbon used in the first step is preferably a catalyst composite-carried carbon subjected to an acid treatment before the firing under the inert gas atmosphere. In the present invention, "acid treatment" means washing the catalyst composite-carried carbon with acid.

By washing the catalyst composite-carried carbon with acid, the titanium oxide present on the surface of the platinum-titanium oxide composite particles and the electroconductive carrier can be dissolved, with hardly dissolving the platinum and the electroconductive carrier. Therefore, only the titanium oxide which is a cause for decrease in MEA performance, can be removed.

It is also preferable to selectively dissolve the titanium oxide on the surface of the platinum-titanium oxide composite particles, because the surface can be uniformly coated with the platinum, and catalytic activity can be increased.

On the surface of the catalyst composite-carried carbon subjected to the acid treatment, the amount of the acidic functional groups may be increased. However, by the production method of the present invention, the amount of the acidic functional groups on the surface can be decreased, so that the resulting electrode can be used as an electrode material, without any problem.

In the acid treatment, it is preferable to carry out the washing by dispersing the catalyst composite-carried carbon in liquid acid. The acid used is preferably inorganic acid. The inorganic acid is preferably nitric acid or hydrofluoric acid, more preferably hydrofluoric acid. The method for dispersing the catalyst composite-carried carbon in the liquid acid is not particularly limited. For example, there may be mentioned a method for dispersing the catalyst composite-carried carbon by means of an ultrasonic homogenizer, a magnetic stirrer, a motor furnished with stirring blades, or the like.

The concentration of the acid is not particularly limited, as long as it is a concentration at which the titanium oxide can be dissolved. The concentration is preferably 1 to 46% by mass, particularly preferably 5 to 46% by mass.

The temperature of the acid is not particularly limited. It is preferably 15 to 25° C.

The time to wash the catalyst composite-carried carbon with the acid is not particularly limited. It is preferably one to six hours.

(2) The Second Step (the Step of Producing the Catalyst Ink)

The second step is a step of producing the catalyst ink by mixing the catalyst composite-carried carbon obtained in the first step, an ionomer, and a solvent which contains at least water, alcohol and acetic acid and in which the acetic acid accounts for 29 to 63% by mass of the total amount of the water, alcohol and acetic acid.

As described above, in the catalyst composite-carried carbon obtained in the first step, the amount of the acidic functional groups on the surface of the carbon carrier has been decreased. Therefore, the surface is more hydrophobic than that before subjected to the firing. It is better that the carbon carrier surface is more hydrophobic, since the adsorption of the ionomer on the catalyst composite-carried carbon in the catalyst ink is promoted by hydrophobic interaction. Therefore, the ionomer can be easily adsorbed on the catalyst composite-carried carbon by firing under the above-specified conditions.

The ionomer used in the present invention is not particularly limited, as long as it is an ionomer that can be generally used as a fuel cell electrolyte. For example, there may be mentioned fluorine-based polymer electrolytes including perfluorosulfonic acid polymer-based electrolytes such as Nafion (trademark; manufactured by DuPont) and hydrocarbon-based polymer electrolytes obtained by introducing a protonic acid group (proton conductive group) such as sulfonic acid group, carboxylic acid group, phosphoric acid group or boronic acid group to a hydrocarbon-based polymer such as engineering plastic (e.g., polyether ether ketone, polyether ketone, polyether sulfone, polyphenylene sulfide, polyphenylene ether, polyparaphenylene) or commodity plastic (e.g., polyethylene, polypropylene, polystyrene).

The solvent of the catalyst ink used in the present invention contains at least water, alcohol and acetic acid, and the acetic acid accounts for 29 to 63% by mass of the total amount of the water, alcohol and acetic acid.

To disperse the ionomer without dissolving the same, a mixed solution of water and alcohol is generally used as an ionomer dispersing solution. In general, the solvent of the catalyst ink conforms to the ionomer dispersing solution. When the catalyst composite-carried carbon has a relatively hydrophobic surface, by adding acetic acid to the mixed solution of water and alcohol, the affinity between the catalyst composite-carried carbon and the solvent can be increased, and the dispersibility of the catalyst composite-carried carbon in the catalyst ink can be increased.

The affinity between the catalyst composite-carried carbon and the solvent can be expressed by heat of wetting.

The heat of wetting can be obtained by the following method, for example: using a twin conduction calorimeter, the electroconductive carbon carrier is put into an ampule, and the solvent is put into a sample cell; the ampule tube is broken to immerse the electroconductive carbon carrier in the solvent, and the amount of heat is measured at that time. It can be said that as the amount of heat increases, the affinity between the electroconductive carbon carrier and the solvent increases.

The relationship of heat of wetting (J/g) between a relatively hydrophobic carbon carrier (the amount of the acidic functional groups on the surface: 0.98 μmol/m$^2$) and various kinds of solvents is shown below, the carbon carrier being obtained by firing nitric acid-treated CA250 in the conditions of the above first step. Also, the relationship of heat of wetting (J/g) between a relatively hydrophilic carbon carrier (the amount of the acidic functional groups on the surface: 2.80 μmol/m$^2$) and various kinds of solvents is shown below, the carbon carrier being obtained by not firing nitric acid-treated OSAB.

Fired Carbon Carrier:
Acetic acid (26.4)>propanol (21.9)>ethanol (21.7)>t-butanol (21.1)>water (4.9)

Unfired Carbon Carrier:
Acetic acid (81.7)>ethanol (71.7)>propanol (69.4)>t-butanol (54.2)>water (46.0)

For the unfired carbon carrier, there is about two times difference in the heat of wetting between water and acetic acid. For the fired carbon carrier, there is about five times difference in the heat of wetting between water and acetic acid. From this result, it is clear that the hydrophobic fired carbon carrier is largely affected by the type of the solvent.

As described above, in the case of immersing the unfired carbon carrier in water, for which it has the lowest affinity, the heat of wetting is 46.0 J/g. In the case of immersing the fired carbon carrier in acetic acid, for which it has the highest affinity, the heat of wetting is 26.4 J/g. The fired carbon carrier is advantageous in that it has high hydrophobicity; however, it is disadvantageous in that it has relatively low affinity for the solvent. Therefore, it is clear that in the case of using the hydrophobic fired carbon carrier, to increase the affinity for the solvent, it is needed to add acetic acid as the solvent of the catalyst ink.

It is also clear that in the case of the hydrophobic fired carbon carrier, no difference is found between the affinity for propanol, that for ethanol and that for t-butanol; therefore, any alcohol can be used as the solvent of the catalyst ink, without any influence on the affinity.

In the solvent of the catalyst ink, when the acetic acid accounts for less than 29% by mass of the total amount of the water, alcohol and acetic acid, the affinity for the catalyst composite-carried carbon obtained in the first step, which has a relatively hydrophobic surface, is insufficient, so that the coverage of the catalyst composite-carried carbon with the ionomer decreases. Therefore, it is not preferable that the acetic acid content is less than 29% by mass.

Meanwhile, in the solvent of the catalyst ink, when the acetic acid accounts for more than 63% by mass of the total amount of the water, alcohol and acetic acid, the ionomer is dissolved in the catalyst ink and cannot maintain the dispersed state, so that the coverage of the catalyst composite-carried carbon with the ionomer decreases. Therefore, it is not preferable that the acetic acid content is more than 63% by mass.

The acetic acid preferably accounts for 29 to 50% by mass of the total amount of the water, alcohol and acetic acid, more preferably 30 to 45% by mass.

Also in the present invention, the water preferably accounts for 3.4 to 9.8% by mass of the total amount of the water, alcohol and acetic acid, from a viewpoint of practical use. It is more preferably 5.0 to 7.0% by mass, since drying can be easy in the below-mentioned third step.

The method for dispersing the catalyst ink is not particularly limited. For example, there may be mentioned a homogenizer, a bead mill, a shear mixer, a roll mill, etc.

(3) The Third Step (the Step of Forming the Catalyst Layer)

The third step is a step of forming the catalyst ink obtained in the second step into the catalyst layer. The fuel cell electrode including the catalyst layer produced in the third step can be used as an oxidant electrode or fuel electrode.

The method for producing the catalyst layer is not particularly limited, as long as it is a method that can form the catalyst layer so as to have a structure in which the catalyst layer is disposed on the electrolyte membrane. Also, the thickness of the catalyst layer is not particularly limited.

The method for applying the catalyst ink, the method for drying the same, etc., can be appropriately selected. For example, as the method for applying the catalyst ink, there may be mentioned a spraying method, a screen printing method, a doctor blade method, a gravure printing method, a die coating method, etc. As the method for drying the catalyst ink, for example, there may be mentioned drying under reduced pressure, heat drying, heat drying under reduced pressure, etc. The conditions of the drying under reduced pressure or heat drying are not particularly limited and can be appropriately determined.

As the material for the electrolyte membrane, there may be used those described above as the material for the ionomer.

The thickness of the electrolyte membrane is not particularly limited and is preferably 5 to 30 μm.

As needed, the electrode including the catalyst layer can include a gas diffusion layer. In the case of including the gas diffusion layer, the electrode structure is not particularly limited and is preferably a layered structure in which the catalyst layer and the gas diffusion layer are stacked in this order from closest to the electrolyte membrane.

A gas diffusion layer sheet is used to form the gas diffusion layer. As the gas diffusion layer sheet, there may be mentioned a sheet having gas diffusivity that can efficiently supply gas to the catalyst layer, electroconductivity, and strength that is required of the material for forming the gas diffusion layer. For example, there may be mentioned a carbonaceous porous material such as carbon paper, carbon cloth or carbon felt, and an electroconductive porous material such as a metal mesh or metal porous material made of a metal such as titanium, aluminum, copper, nickel, nickel-chromium alloy, copper alloy, silver, aluminum alloy, zinc alloy, lead alloy, niobium, tantalum, iron, stainless-steel, gold or platinum. The thickness of the electroconductive porous material is preferably about 50 to 500 μm.

The gas diffusion layer sheet can be made of a single layer of an electroconductive porous material as described above, or a water repellent layer can be formed on a side facing the catalyst layer of the sheet. The water repellent layer generally has a porous structure that contains an electroconductive powder (granular) material such as carbon particles or carbon fibers, a water repellent resin such as polytetrafluoroethylene (PTFE), etc. The water repellent layer is not always necessary; however, it is advantageous in that the water drainage property of the gas diffusion layer can be increased, with maintaining an appropriate amount of water in the catalyst layer and the electrolyte membrane, and electrical contact between the catalyst layer and the gas diffusion layer can be improved.

EXAMPLES

Synthesis of a Catalyst Composite-Carried Carbon Containing Platinum, a Titanium Oxide and an Electroconductive Carbon Production Example 1

First, 20.00 g of sodium acetate, 16.86 g of dibenzylideneacetone (dba) and 430 mL of ethanol were put into a 1 L four-necked flask.

The temperature of an oil bath was set to 50° C. Argon gas was bubbled into the mixture for one hour.

Meanwhile, 10.00 g of $K_2PtCl_4$ was dissolved in 86 mL of ultrapure water. Argon gas was bubbled into the resulting aqueous solution for one hour.

The $K_2PtCl_4$ aqueous solution was added to the ethanol solution in the 1 L four-necked flask, in a dropwise manner.

Argon gas was flowed into the mixture, instead of being bubbled into the mixture, and the temperature of the oil bath was set to 100° C.

The mixture was refluxed for 12 hours, and then the heat source was turned off.

After the temperature of the reaction solution decreased to room temperature, suction filtration was carried out thereon.

Then, 150 mL of ultrapure water was added to a collected sample, and the mixture was stirred for 15 minutes at room temperature. Then, the sample was collected by suction filtration. This operation was repeated three times.

The collected sample was dried under reduced pressure for 48 hours, thereby obtaining $Pt_2(dba)_3$.

The following processes were all conducted inside a glove box.

As an electroconductive carbon carrier, 2.10 g of CA250 (product name; manufactured by: Denka. Co., Ltd.) dried under reduced pressure at 130° C. for 12 hours, was put into a 500 mL beaker. As a solvent, 210 mL of deoxidized/dehydrated THF was put into the beaker. With stirring the THF solution with stirrer tips, a cycle of a one-minute homogenization and a one-minute stopping was repeatedly carried out on the solution for 20 minutes. Then, to cool the THF solution having an increased temperature, the solution was stirred for 30 minutes, thereby preparing an electroconductive carbon carrier dispersion.

As a titanium compound, 1.24 g of $TiCl_4(THF)_2$ was dissolved in 50 mL of deoxidized/dehydrated THF, which is a solvent, and passed through a filter having a pore size of 5 μm, thereby preparing a titanium-containing solution. Then, the titanium-containing solution was added to the electroconductive carrier dispersion in a dropwise manner.

As a platinum compound, 2.02 g of $Pt_2(dba)_3$ was dissolved in 200 mL of deoxidized/dehydrated THF and passed through a filter having a pore size of 5 μm, thereby preparing a platinum-containing solution. Then, the platinum-containing solution was added in the electroconductive carbon carrier dispersion in a dropwise manner.

Then, with stirring the mixed solution with stirrer tips, a cycle of a 5-second homogenization and a 5-second stopping was repeatedly carried out on the mixed solution for 20 minutes.

To cool the mixed solution having an increased temperature, the mixed solution was stirred for 30 minutes, thereby forming a catalyst precursor in which the platinum ion compound and the titanium ion compound were carried on the electroconductive carbon carrier.

To prevent the sample from bumping and scattering, the beaker was changed to a 2 L beaker. With stirring the mixed solution with stirrer tips, the mixed solution was depressurized inside the glove box to remove THF therefrom. After the removal of THF, the sample was collected and then pulverized in an agate mortar, thereby obtaining a catalyst precursor.

The inside of a tubular furnace was depressurized with a vacuum pump, kept for 10 minutes and then purged with argon. This operation was repeated five times.

Inside a glove box, 1.20 g of the catalyst precursor was put into a quartz boat.

The hole of the boat was covered with a parafilm. Then, the boat was sealed in a zippered bag.

The boat being sealed in the zippered bag was taken out of the glove box. With sending argon gas at a flow rate of 1000 mL/min, the boat was placed inside the tubular furnace.

The inside of the tubular furnace was depressurized with a vacuum pump, kept for 10 minutes and then purged with argon. This operation was repeated five times.

With sending 100% hydrogen at a flow rate of 1000 mL/min, a preset temperature of the furnace was raised by 100° C. every 15 minutes so as to set the heating rate to 10° C./min. Thus, the temperature inside the tubular furnace was increased from room temperature to 500° C. and kept at 500° C. for two hours. Then, the heat source was turned off to naturally cool the temperature.

After the temperature of the furnace decreased to room temperature, the supplied gas was switched to a mixed gas of 5% oxygen and 95% nitrogen, and the gas supply was kept for three hours, thereby obtaining a fired product.

Then, 0.40 g of the fired product obtained in the firing step and 100 mL of 1.0 mol/L nitric acid were put into a 300 mL plastic cup and stirred at room temperature for 6 hours with stirrer tips.

After the stirring, the reaction solution was subjected to suction filtration to collect a sample.

Then, 100 mL of ultrapure water was added to the collected sample, and the mixture was stirred for 20 minutes at room temperature. After the stirring, suction filtration was carried out thereon. Washing with ultrapure water was repeated until the filtrate became neutral.

A catalyst cake thus obtained was dried under reduced pressure for 12 hours, thereby obtaining the catalyst composite-carried carbon containing the platinum, the titanium oxide and the electroconductive carbon.

Production Example 2

A catalyst composite-carried carbon was produced in the same manner as Production Example 1, except that OSAB (product name; manufactured by: Denka Co., Ltd.) was used as the electroconductive carbon carrier, in place of CA250.

[Production of a Fuel Cell Electrode and a Membrane Electrode Assembly]

Example 1

[First Step]
First, 4 g of the catalyst composite-carried carbon produced in Production Example 1 was fired for one hour in a tubular furnace under a 100% argon atmosphere at 250° C.

[Second Step]
Next, 1 g of the catalyst composite-carried carbon fired in the first step was put into a plastic ointment container. Then, 17.48 g of t-butanol, 0.25 g of water, 5.63 g of a Nafion-based fluorinated sulfonic acid polymer dispersion (composition: solid content 10% by mass, propanol 45% by mass, water 45% by mass) and 17.21 g of acetic acid were added thereto. Zirconia beads having a diameter of 1 mm were put into the plastic ointment container, and the mixture was dispersed with a bead mill at 300 rpm for 6 hours, and then defoamed with a revolution defoaming device. After the defoaming, the resultant was subjected to pressure filtration with a 12 μm membrane filter.

[Third Step]
The catalyst ink produced in the second step was casted on a polytetrafluoroethylene (PTFE) sheet so that the Pt amount per $cm^2$ electrode area became 0.1 mg. The casted ink was naturally dried. The polytetrafluoroethylene sheet was cut into a square piece with 1 $cm^2$ to obtain an electrode catalyst layer. The electrode catalyst layer and an electrolyte membrane made of a Nafion-based fluorinated sulfonic acid polymer were laid on each other and bonded together by pressing them at 3 MPa for 4 minutes at 150° C., thereby obtaining a membrane electrode assembly (MEA).

Example 2

An MEA was produced in the same manner as Example 1, except that in the second step, the amount of the t-butanol added and that of the acetic acid added were changed to 23.08 g and 11.61 g, respectively.

Example 3

An MEA was produced in the same manner as Example 1, except that in the second step, the amount of the t-butanol added and that of the acetic acid added were changed to 9.47 g and 25.21 g, respectively.

Comparative Example 1

An MEA was produced in the same manner as Example 1, except that the first step was not carried out; in the second step, the amount of the t-butanol added and that of the water added were changed to 4.47 g and 25.47 g, respectively; and in the second step, the acetic acid was not added.

Comparative Example 2

An MEA was produced in the same manner as Comparative Example 1, except that 1 g of the catalyst composite-carried carbon produced in Production Example 2 was used, and in the second step, the amount of the t-butanol added and that of the water added were changed to 6.89 g and 23.05 g, respectively.

Comparative Example 3

An MEA was produced in the same manner as Comparative Example 1, except that in the second step, the amount of the t-butanol added and that of the water added were changed to 26.00 g and 3.94 g, respectively.

Comparative Example 4

An MEA was produced in the same manner as Comparative Example 1, except that in the second step, the amount of the t-butanol added and that of the water added were changed to 14.97 g and 14.97 g, respectively.

Comparative Example 5

An MEA was produced in the same manner as Comparative Example 2, except that in the second step, the amount of the t-butanol added and that of the water added were changed to 26.35 g and 3.59 g, respectively.

Comparative Example 6

An MEA was produced in the same manner as Example 1, except that the first step was not carried out.

Comparative Example 7

An MEA was produced in the same manner as Example 1, except that in the second step, the amount of the t-butanol added and that of the water added were changed to 3.56 g and 26.38 g, respectively, and the acetic acid was not added.

Comparative Example 8

An MEA was produced in the same manner as Comparative Example 7, except that in the second step, the amount of the t-butanol added and that of the water added were changed to 26.38 g and 3.56 g, respectively.

Comparative Example 9

An MEA was produced in the same manner as Comparative Example 7, except that in the second step, the amount of the t-butanol added and that of the water added were changed to 29.67 g and 0.27 g, respectively.

Comparative Example 10

An MEA was produced in the same manner as Example 1, except that in the second step, the amount of the t-butanol added, that of the water added, and that of the acetic acid added were changed to 27.09 g, 5.05 g and 2.80 g, respectively.

Comparative Example 11

An MEA was produced in the same manner as Example 1, except that in the second step, the amount of the t-butanol added, that of the water added, and that of the acetic acid added were changed to 0.67 g, 0.68 g and 33.59 g, respectively.

[Measurement of the Amount of the Acidic Functional Groups on the Surface of the Catalyst Composite-Carried Carbon]

As described above, the amount of the acidic functional groups on the surface of the catalyst composite-carried carbon (μmol/m$^2$) was calculated by dividing the amount of the adsorbed ammonia gas (mol/g) per mass of the catalyst composite-carried carbon by the BET surface area (m$^2$/g) per mass of the carbon carrier contained in the catalyst composite-carried carbon.

In particular, at 25° C., the catalyst composite-carried carbon obtained in the first step or the catalyst composite-carried carbon obtained in any of the production examples as it was, was put into a measurement cell of an automatic adsorbed gas amount measuring device (product name: AC-1-C/VP/TCD/MS; manufactured by: Quantachrome) and degassed for two hours. Then, ammonia gas was introduced therein, and pressures before and after the introduction were measured. From the pressures before and after the introduction of the ammonia gas, using the formula (1), the amount of the adsorbed ammonia gas (mol/g) per mass of the catalyst composite-carried carbon was calculated.

Next, at 100° C., the catalyst composite-carried carbon was put into a measurement cell of an automatic specific surface area/pore size distribution measuring device (product name: BELSORP-mini II; manufactured by: BEL Japan, Inc.) and degassed for two hours. Then, nitrogen gas was introduced therein, and pressures before and after the introduction were measured. From the pressures before and after the introduction of the nitrogen gas, the amount of the adsorbed nitrogen gas (mol/g) per mass of the catalyst composite-carried carbon was calculated by the formula (1). From the thus-calculated amount of the adsorbed nitrogen gas (mol/g), the BET surface area (m$^2$/g) per mass of the catalyst composite-carried carbon was calculated by the formula (2). Measurement of the mass ratio of the carbon contained in the catalyst-carried carbon was carried out by the NCH method, using an elemental analyzer that can measure the total nitrogen, the total carbon and the total hydrogen (product name: SUMIGRAPH NCH-22; manufactured by: Sumika Chemical Analysis Service, Ltd.). Since nitrogen gas cannot be easily adsorbed to the surface of platinum, the BET surface area (m$^2$/g) per mass of the carbon carrier contained in the catalyst composite-carried carbon was calculated by the formula (3), considering that nitrogen gas was adsorbed only to the surface of carbon.

[Measurement of Ionomer Coverage]

Measurement of the coverage of the catalyst composite-carried carbon in the electrode obtained in each of Examples and Comparative Examples with the ionomer (ionomer coverage) was carried out. The ionomer coverage was obtained by using the value of the electrochemical surface area of the platinum calculated by carrying out cyclic voltammetry (CV) measurement in a fluorine solvent on the electrode, and the value of the electrochemical surface area of the platinum calculated by carrying out CV measurement in a water solvent on the electrode.

In particular, the specific surface area of the platinum in Fluorinert FC-3283 (product name; manufactured by: 3M) was calculated by using a fuel cell in which the MEA obtained in each of Examples and Comparative Examples was incorporated. Fluorinert was supplied to the cathode of the thus-produced fuel cell to immerse the cathode in Fluorinert. Humidified hydrogen gas was supplied to the anode at a flow rate of 0.5 NL/min. At this time, the temperatures of the anode and cathode were 40° C., and the dew point of the anode was set to 40° C.

While the cathode was immersed in Fluorinert and the anode was supplied with hydrogen, CV measurement was carried out on the fuel cell. The range of voltage applied to the fuel cell was set to 0 to 1.0 V, and the sweep rate was set to 50 mV/sec. In this state, the current (A) flowing through the fuel cell (A) was measured. From the relationship between the thus-obtained voltage and current, the cyclic voltammogram of the fuel cell was obtained. From the value obtained by dividing the charge amount (C) at the hydrogen desorption peak by the charge amount (C/m$^2$) per unit active surface area of the platinum and the mass (g) of the platinum, the electrochemical surface area (m$^2$/g-Pt) of the platinum in the fluorine solvent was obtained.

The specific surface area of the platinum in the water solvent was calculated in the same manner as the method for calculating the specific surface area of the platinum in the fluorine solvent, except that the cathode of the fuel cell in which the thus-produced MEA was incorporated, was immersed in ultrapure water, in place of Fluorinert.

The ionomer coverage was calculated by the following formula (4):

Ionomer coverage={Electrochemical surface area (m$^2$/g-Pt) of the platinum in the fluorine solvent/Electrochemical surface area (m$^2$/g-Pt) of the platinum in the water solvent}×100    Formula (4)

[Measurement of Performance Maintenance Ratio]

Measurement of the performance maintenance ratio of the MEA obtained in each of Examples and Comparative Examples was carried out. The performance maintenance ratio was expressed by the ratio of a voltage value that shows a current density value of 0.2 A/cm$^2$ under a low humidity condition (40% RH) to a voltage value that shows a current density value of 0.2 A/cm$^2$ under a high humidity condition (100% RH). This ratio is an indicator that shows robustness with respect to humidity condition.

First, under the following high humidity conditions, electricity was generated by the fuel cell in which the MEA obtained in each of Examples and Comparative Examples was incorporated, and the voltage value at a current density value of 0.2 A/cm$^2$ was calculated.

Anode gas: Hydrogen gas at a relative humidity (RH) of 100% (bubbler dew point 80° C.)

Cathode gas: Pure oxygen at a relative humidity (RH) of 100% (bubbler dew point 80° C.)

Cell temperature (cooling water temperature): 80° C.

Next, under the following low humidity conditions, electricity was generated by the fuel cell in which the MEA obtained in each of Examples and Comparative Examples was incorporated, and the voltage value at a current density value of 0.2 A/cm$^2$ was calculated.

Anode gas: Hydrogen gas at a relative humidity (RH) of 40% (bubbler dew point 80° C.)

Cathode gas: Pure oxygen at a relative humidity (RH) of 40% (bubbler dew point 80° C.)

Cell temperature (cooling water temperature): 80° C.

The performance maintenance ratio was calculated by the following formula (5):

Performance maintenance ratio={Voltage value at a low humidity (40% RH) condition (0.2 A/cm$^2$)/

Voltage value at a high humidity (100% RH) condition (0.2 A/cm²)}×100   Formula (5)

[Evaluation Results]

The production conditions, characteristics and evaluation results of the electrodes produced in Examples and Comparative Examples are shown in Table 1.

Next, the ionomer coverage will be discussed. The electrodes of Examples 1 to 3 using the catalyst composite-carried carbons fired in the first step under the inert gas atmosphere and the electrodes of Comparative Examples 8 to 10 using the catalyst composite-carried carbon fired in the first step, have relatively high ionomer coverages. In con-

TABLE 1

| | First step | Acidic functional groups (µmol/m²) | Carbon carrier | Ink composition | | | Amount of ionomer added | Coverage | 80° C./100% RH voltage value (0.2 A/cm²) | 80° C./40% RH voltage value (0.2 A/cm²) | Performance maintenance ratio |
|---|---|---|---|---|---|---|---|---|---|---|---|
| | | | | Water | Alcohol | Acetic acid | | | | | |
| Comparative Example 1 | No | 2.60 | CA250 | 80 | 20 | 0 | 0.75 | 58 | 0.8221 | 0.7393 | 89.9 |
| Comparative Example 2 | No | 3.39 | OSAB | 73 | 27 | 0 | 0.75 | 60 | 0.8294 | 0.7491 | 90.3 |
| Comparative Example 3 | No | 3.02 | CA250 | 18 | 82 | 0 | 0.75 | 70 | 0.8433 | 0.7783 | 92.3 |
| Comparative Example 4 | No | 1.90 | CA250 | 50 | 50 | 0 | 0.75 | 82 | 0.8428 | 0.7979 | 94.7 |
| Comparative Example 5 | No | 1.77 | OSAB | 17 | 83 | 0 | 0.75 | 72 | 0.8382 | 0.7770 | 92.7 |
| Comparative Example 6 | No | 1.98 | CA250 | 7.0 | 50 | 43 | 0.75 | 40 | 0.8111 | 0.7001 | 86.3 |
| Comparative Example 7 | Yes | 0.95 | CA250 | 83 | 17 | 0 | 0.75 | 50 | 0.8397 | 0.7418 | 88.3 |
| Comparative Example 8 | Yes | 1.41 | CA250 | 17 | 83 | 0 | 0.75 | 87 | 0.8569 | 0.8197 | 95.7 |
| Comparative Example 9 | Yes | 1.02 | CA250 | 8.0 | 92 | 0 | 0.75 | 87 | 0.8543 | 0.8124 | 95.1 |
| Comparative Example 10 | Yes | 1.00 | CA250 | 19 | 74 | 7.0 | 0.75 | 85 | 0.8555 | 0.8150 | 95.3 |
| Comparative Example 11 | Yes | 0.98 | CA250 | 8.0 | 8.0 | 84 | 0.75 | 66 | 0.8119 | 0.7315 | 90.1 |
| Example 1 | Yes | 1.01 | CA250 | 7.0 | 50 | 43 | 0.75 | 100 | 0.8638 | 0.8485 | 98.2 |
| Example 2 | Yes | 1.19 | CA250 | 7.0 | 64 | 29 | 0.75 | 99 | 0.8679 | 0.8508 | 98.0 |
| Example 3 | Yes | 1.10 | CA250 | 7.0 | 30 | 63 | 0.75 | 90 | 0.8573 | 0.8252 | 96.3 |

The amounts of the acidic functional groups on the surfaces of the catalyst composite-carried carbons which were not fired in the first step and were used in Comparative Examples 1 to 6, are 1.77 to 3.39 µmol/m². Meanwhile, the amounts of the acidic functional groups on the surfaces of the catalyst composite-carried carbons which were fired in the first step and were used in Examples 1 to 3 and Comparative Examples 7 to 11, are 0.95 to 1.41 µmol/m².

The reason why the amounts of the acidic functional groups vary among the catalyst composite-carried carbons produced in the same production conditions, is as follows: in the present circumstances, the amount of the catalyst composite-carried carbon that can be produced in one batch allows the production of only one fuel cell, so that the respective examples are forced to use the catalyst composite-carried carbon with a different lot number.

As shown in Table 1, although there is variability in numerical values, the amount of the acidic functional groups on the surface of the catalyst composite-carried carbon is decreased to 1.41 µmol/m² even at the maximum, by the firing in the first step. Considering that the amount of the acidic functional groups of the unfired catalyst composite-carried carbons is 1.77 µmol/m² at the minimum, it is clear that the amount of the acidic functional groups on the surface of the catalyst composite-carried carbon is decreased by the firing.

Accordingly, it is clear that the surface of the catalyst composite-carried carbon is hydrophobized by the firing in the first step of the production method of the present invention.

trast, the ionomer coverage of the electrodes using the catalyst composite-carried carbons that were not fired under an inert gas atmosphere, is only 82% at the maximum, even though the composition of the solvent of the catalyst ink was optimized. The reason is considered as follows: the unfired catalyst composite-carried carbon is relatively hydrophilic, since the amount of the acidic functional groups on the carbon carrier surface is large; therefore, the hydrophobic interaction with the ionomer is weak, and the adsorption of the ionomer to the catalyst composite-carried carbon does not easily proceed.

In the case where acetic acid was not used as the solvent of the catalyst ink although the catalyst composite-carried carbon fired in the first step was used, the ionomer coverage is 87% at the maximum (Comparative Examples 8 and 9). The reason is considered to be that the affinity between the catalyst composite-carried carbon and the solvent composed of water and alcohol only is low. The performance maintenance ratio of Comparative Example 8 is as relatively high as 95.7%. However, from the viewpoint of practical use, when the performance maintenance rate is not 96% or more in this test, it is required to install a humidifier and always supply high-humidity gas to the fuel cell electrode, so that the fuel cell system cannot be simplified. Therefore, it can be said that the ionomer coverage of Comparative Example 8 is insufficient.

Even in the case where the catalyst composite-carried carbon fired in the first step was used and acetic acid was used in the solvent of the catalyst ink, only the electrodes of Examples 1 to 3 in which the acetic acid accounts for 29 to 63% by mass of the total amount of the water, alcohol and acetic acid, have an ionomer coverage of 90% or more and are allowed to have a performance maintenance ratio of 96% or more, which is a value that can simplify the fuel cell system.

The reason why the ionomer coverage and performance maintenance ratio of Comparative Example 10 in which the acetic acid content is less than 29% (7%) are low, is considered to be that similarly to the case of not containing acetic acid, the affinity between the solvent of the catalyst ink and the catalyst composite-carried carbon is low. The reason why the ionomer coverage and performance maintenance ratio of Comparative Example 11 in which the acetic acid content is more than 63% (84%) are low, is considered to be that the ionomer cannot keep the state of being dispersed in the catalyst ink and is dissolved therein.

As a result of comparing the voltage values at a current density of 0.2 A/cm$^2$ under a high humidity condition of 100% RH and a low humidity condition of 40% RH, significant differences are not found between the voltage values of all Examples and Comparative Examples under the high humidity condition. However, the fuel cells using the MEAs of Examples show higher voltage values under the low humidity condition, in comparison with the fuel cells using the MEAs of Comparative Examples. Therefore, it is clear that the increase in the performance maintenance ratio of the electrode obtained by the production method of the present invention, is not due to the decrease in the battery performance under the high humidity condition, and it is due to the increase in the performance under the low humidity condition.

From the above results, it is clear that the production method of the present invention makes it possible to produce the fuel cell electrode including the catalyst composite-carried carbon containing the platinum, the titanium oxide and the electroconductive carbon, which is able to deliver stable electricity generation performance even if a change in humidity condition coincides.

The invention claimed is:

1. A method for producing a fuel cell electrode comprising a catalyst layer that contains a catalyst composite-carried carbon containing platinum, a titanium oxide and an electroconductive carbon, wherein the method comprises:
   a first step of washing the catalyst composite-carried carbon with acid;
   a second step of decreasing an amount of acidic functional groups on a surface of the catalyst composite-carried carbon obtained in the first step by firing the catalyst composite-carried carbon at 250° C. or more under an inert gas atmosphere;
   a third step of producing a catalyst ink by mixing the catalyst composite-carried carbon obtained in the second step, an ionomer, and a solvent which contains at least water, alcohol and acetic acid and in which the acetic acid accounts for 29 to 63% by mass of a total mass amount of the water, alcohol and acetic acid; and
   a fourth step of forming the catalyst layer using the catalyst ink obtained in the third step.

2. The method for producing the fuel cell electrode according to claim 1, wherein the amount of the acidic functional groups on the surface of the catalyst composite-carried carbon obtained in the second step is 1.20 μmol/m$^2$ or less.

3. The method for producing the fuel cell electrode according to claim 1, wherein the water accounts for 3.4 to 9.8% by mass of the total mass amount of the water, alcohol and acetic acid in the solvent used in the third step.

* * * * *